US008203928B2

(12) United States Patent
Aggarwal et al.

(10) Patent No.: US 8,203,928 B2
(45) Date of Patent: Jun. 19, 2012

(54) SYSTEM AND METHOD FOR SELECTING A NUMBER OF SPATIAL STREAMS TO BE USED FOR TRANSMISSION BASED ON PROBING OF CHANNELS

(75) Inventors: Pankaj Aggarwal, Lake Mary, FL (US); Avinash Joshi, Lake Mary, FL (US); Manish Shukla, Altamonte Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 530 days.

(21) Appl. No.: 12/415,723

(22) Filed: Mar. 31, 2009

(65) Prior Publication Data
US 2010/0246481 A1    Sep. 30, 2010

(51) Int. Cl.
*H04J 11/00* (2006.01)
*H04W 4/00* (2009.01)
(52) U.S. Cl. .................. 370/203; 370/329; 370/431
(58) Field of Classification Search .................. None
See application file for complete search history.

(56) References Cited

U.S. PATENT DOCUMENTS

| 7,321,580 | B1* | 1/2008 | Ramanathan et al. | 370/339 |
|---|---|---|---|---|
| 2005/0201307 | A1* | 9/2005 | Chae et al. | 370/310 |
| 2005/0286440 | A1 | 12/2005 | Strutt et al. | |
| 2007/0195820 | A1* | 8/2007 | So et al. | 370/470 |
| 2008/0068217 | A1* | 3/2008 | Van Wyk et al. | 340/870.11 |
| 2008/0165692 | A1 | 7/2008 | Strutt et al. | |
| 2008/0320356 | A1* | 12/2008 | Tokita | 714/749 |
| 2009/0213741 | A1* | 8/2009 | Wang et al. | 370/252 |
| 2009/0290661 | A1* | 11/2009 | Barriac et al. | 375/343 |
| 2010/0067401 | A1* | 3/2010 | Medvedev et al. | 370/253 |

OTHER PUBLICATIONS

Kodzovi Acolatse et al., "An Alamouti Hybrid-ARQ Scheme for MIMO Systems," 14th IST Mobile & Wireless Communication Summit, Jun. 2005, pp. 1-5.
IEEE 801.11n Draft2.0, "Link Adaptation," 9.16, Feb. 2007, pp. 145-148.
Dionysios Skordoulis et al., "IEEE 802.11n MAC Frame Aggregation Mechanisms for Next Generation High Throughput WLANS," IEEE Wireless Communications, Feb. 2008, pp. 1-8.
Javier Del Prado Pavon et al., "Link Adaptation Strategy for IEEE 802.11 WLAN via Received Signal Strength Measurement," IEEE, 2003, pp. 1108-1113.
P. Chevillat et al., "A Dynamic Link Adaptation Algorithm for IEEE 802.11a Wireless LANs," IEEE, 2003, pp. 1141-1145.
Severine Catreux et al., "Adaptive Modulation and MIMO Coding for Broadband Wireless Data Networks," IEEE Communications Magazine-Topics in Broadband Access, Jun. 2002, pp. 108-115.
Yuxia Lin et al., "Frame Aggregation and Optimal Frame Size Adaptation for IEEE 802.11n WLANs," IEEE Globecom, 2006, 6 pages.
J.H. Winters, "On the capacity of radio communications systems with diversity in Rayleigh fading environments," IEEE Journal on Selected Areas in Communications, vol. SAC-5, No. 5, Jun. 1987, pp. 871-878.

(Continued)

*Primary Examiner* — Steven H Nguyen
(74) *Attorney, Agent, or Firm* — Randi L. Karpinia

(57) ABSTRACT

Systems and methods are provided for determining a number of spatial channels to use to transmit a data packet from a source node to a destination node. This determination can be made based on a Probability of Channel non-Correlation (PCC) function that is generated and updated by the source node based on feedback from the destination node. The PCC function indicates a probability of whether a plurality of spatial channels are non-correlated.

30 Claims, 5 Drawing Sheets

OTHER PUBLICATIONS

Aris L. Moustakas et al., "MIMO Capacity Through Correlated Channels in the Presence of Correlated Interferers and Noise: A (Not So) Large N Analysis," IEEE Transactions on Information Theory, vol. 49, No. 10, Oct. 2003, 2545-2561.

* cited by examiner

SYSTEM AND METHOD FOR SELECTING A NUMBER OF SPATIAL STREAMS TO BE USED FOR TRANSMISSION BASED ON PROBING OF CHANNELS

FIELD OF THE DISCLOSURE

The present disclosure relates generally to wireless communications and more particularly to wireless communication networks.

BACKGROUND

An infrastructure-based wireless network typically includes a communication network with fixed and wired gateways. Many infrastructure-based wireless networks employ a mobile unit which communicates with a fixed base station or access point that is coupled to a wired network. The mobile unit can move geographically while it is communicating over a wireless link to the base station or access point. When the mobile unit moves out of range of one base station or access point, it may connect or "handover" to a new base station or access point and starts communicating with the wired network through the new base station or access point.

In comparison to infrastructure-based wireless networks, an ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multihopping") until the packets reach the destination node. As used herein, the term "multihop network" refers to any type of wireless network which employs routing protocols among nodes which are part of a network. In such situations, each intermediate node routes the packets (e.g., data and control information) to the next node along the route, until the packets reach their final destination. Nodes in the mesh network use end-to-end path metrics to select a path, from the multiple path options to any destination. The path metrics are generally sum of the individual link metrics along the path.

Multiple-Input Multiple-Output (MIMO) technology and IEEE 802.11n

Today Multiple-Input Multiple-Output (MIMO) technology is being used in many next generation wireless products. IEEE 802.11n specifies the use of MIMO technology for wireless local area networks or WLANs. IEEE 802.11n is a proposed amendment to the IEEE 802.11-2007 wireless networking standard that seeks to significantly improve network throughput over previous standards, such as 802.11b and 802.11g. Draft 7.0 of the IEEE 802.11n standard was approved in November 2008. As used herein, "IEEE 802.11" refers to a set of IEEE Wireless Local Area Network (WLAN) standards that govern wireless networking transmission methods. IEEE 802.11 standards have been and are currently being developed by working group 11 of the IEEE Local Area Network (LAN)/Metropolitan Area Network (MAN) Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.

IEEE 802.11n builds on previous 802.11 standards by adding multiple-input multiple-output (MIMO), and frame aggregation at the MAC layer.

MIMO technology relies on multipath signals—reflected versions of the same signal that arrive at the receiver at different times since they travel over different paths. MIMO uses the multipath signal's diversity to increase a receiver's ability to recover the message information from the signal.

MIMO technology also utilizes Spatial Division Multiplexing (SDM). SDM is the method of transmitting multiple spatial streams from each of the multiple antennas. Each spatial stream is independent of each other and separately encoded. SDM spatially multiplexes multiple independent data streams, transferred simultaneously within one spectral channel of bandwidth. By transmitting different spatial streams of symbols in parallel the throughput or transmission data rate can be increased. Each spatial stream requires a discrete antenna at both the transmitter and the receiver. In one implementation, the IEEE 802.11n draft standard proposes transmitting packets simultaneously using two different bandwidths, and up to four different spatial streams. This can greatly improve performance.

Although MIMO technology increases the physical transmission data rate this does not directly translate into higher throughput. To achieve high throughput IEEE 802.11n proposes use of frame aggregation techniques. Frame aggregation refers to combining many small frames into a larger "aggregate" frame and then transmitting the larger aggregate frame to increase throughput of the network. Multiple packets can be easily aggregated to form large frames that significantly increase the overall throughput. The large aggregate frame has significantly lower Media Access Control (MAC) overhead in comparison to the smaller non-aggregated frames. At the same time, although sending large aggregate frames increases the throughput, packet loss associated with these big aggregate frames can also lead to large drops in throughput.

Thus, coupling MIMO architecture with wider bandwidth channels offers the opportunity of creating very powerful yet cost-effective approaches for a significant increase in the maximum raw (PHY) data rate.

As described above, multiple streams are used to attempt to increase throughput. To transmit on multiple streams, multiple radio frequency (RF) channels are required, and this can only be achieved when there is sufficient antenna separation and sufficient multipath is available in the channel. If the transmitter attempts to send packets on multiple streams when multiple streams are not actually available, packets can be lost. In other words, transmission of packets in parallel requires the availability of non-correlated channels. Inadvertent transmission of packets on multiple streams when channel is correlated can result in packet reception failures at the receiver since the receiver cannot decode the packet. As a result, the entire packet must be retransmitted, and the retransmission of a large packet results in a significant drop in achievable throughput. Retransmissions of large aggregate frames can significantly decrease MAC efficiency and overall throughput. As such, an intelligent system is needed to avoid retransmission of such frames.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
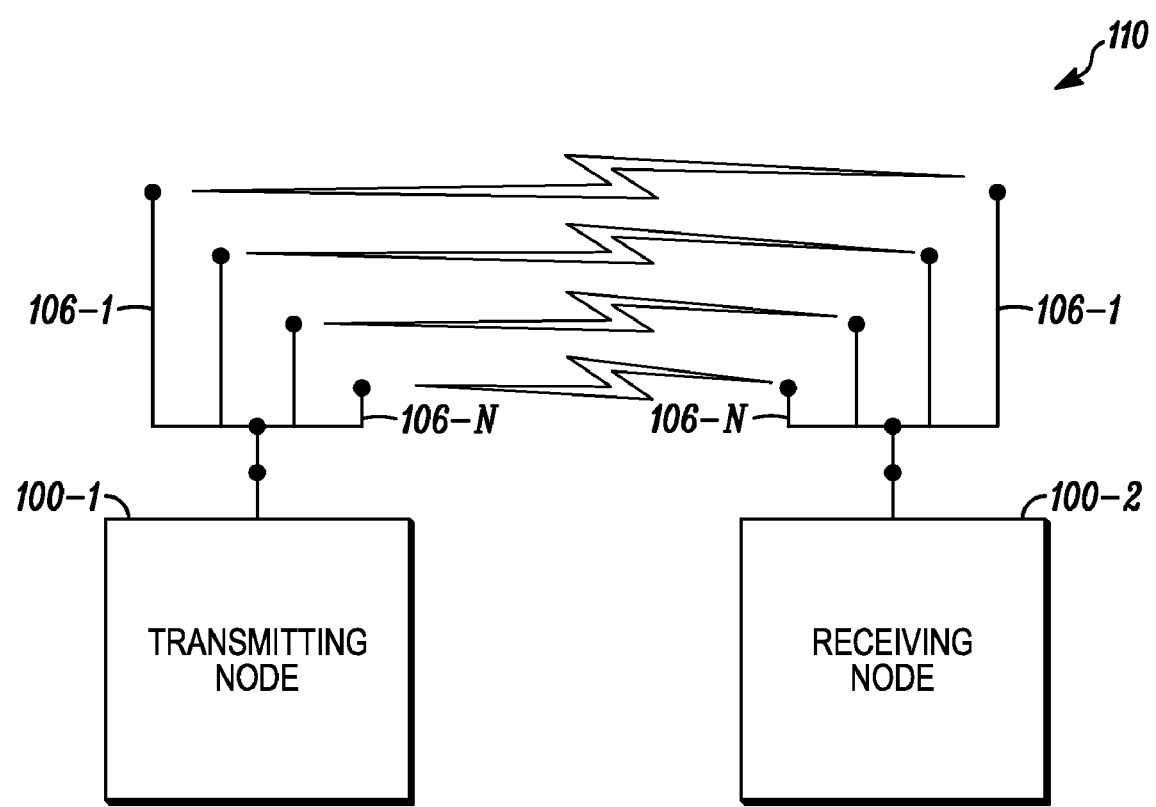
FIG. 1 illustrates a wireless communication network that includes a pair of MIMO-enabled nodes.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with one embodiment, a method is provided for determining a number of spatial channels to use to transmit a data packet from a source node to a destination node. The source node and the destination node are multiple input multiple output (MIMO) enabled, and both include multiple antennas.

In one embodiment, a method for generating a Probability of Channel non-Correlation (PCC) function is provided. The source node generates and updates a PCC function based on feedback from the destination node. The PCC function indicates a probability of whether a plurality of spatial channels are non-correlated. The PCC function can be used to determine the number of spatial channels to be used to transmit a data packet from the source node to the destination node.

In one embodiment, when the source node prepares to transmit the data packet, the source node determines whether a packet size of the data packet is greater than a packet size threshold.

When the packet size of the data packet is less than or equal to the packet size threshold, the source node determines whether a current value of the PCC function is greater than a first threshold. When the current value of the PCC function is greater than the first threshold, this implies that the plurality of non-correlated spaital channels are available for communication with the destination node, and when the current value of the PCC function is less than or equal to the first threshold, this implies that the number of spaital channels for communication with the destination node are correlated. Thus, when the current value of the PCC function is greater than the first threshold, the source node selects a plurality of non-correlated spatial channels to be used for transmission of the data packet to the destination node, and transmits symbols of the data packet from a plurality of different antennas as a plurality of spatial streams over a plurality of non-correlated spatial channels. When the current value of the PCC function is less than or equal to the first threshold, the source node selects a single one of the spatial channels to be used for transmission of the data packet to the destination node and transmits the symbols of data packet from a single antenna as a single stream over the single spatial channel.

In one embodiment, a method is provided for determining, at the source node, whether to transmit a probe packet based on a current value of the PCC function. When the packet size of the data packet is greater than the packet size threshold, the source node can determine whether to transmit a probe packet based on a current value of the PCC function. When the source node determines, based on a current value of the PCC function, that a probe packet should be transmitted, the source node transmits the symbols of the probe packet to the destination node via a plurality of spatial streams over a plurality of spatial channels to generate a data point that characterizes the likelihood of channel non-correlation. Transmitting symbols of the probe packet via a plurality of spatial streams over a plurality of spatial channels allows the source node to obtain data from the destination node that characterizes the likelihood of channel non-correlation. The source node can then use this information to determine a number of spatial streams to be used for transmission of the data packet.

For instance, in one embodiment, the source node can determine whether a current value of the PCC function is greater than an upper PCC threshold, and if so, can randomly determine whether probing is required based on evaluation of a first probability function (PCC) that that provides a general measure of channel non-correlation and biases the probability of whether a probe packet will be transmitted. When the source node determines that probing is required based on evaluation of the first probability function (PCC), the source node can transmit symbols of the probe packet over a plurality of spatial channels to the destination node. When the source node determines that probing is not required based on evaluation of the first probability function (PCC), the source node can transmit symbols of the data packet to the destination node from the plurality of different antennas as a plurality of spatial streams over a plurality of non-correlated spatial channels. When the source node determines that the current value of the PCC function is less than or equal to the upper PCC threshold, the source node can determine whether the current value of the PCC function is greater than a lower PCC threshold. When the source node determines that the current value of the PCC function is less than or equal to the lower PCC threshold, the source node can randomly determine whether probing is required based on evaluation of a second probability function (1-PCC) that provides a general measure of channel correlation and biases the probability of whether a probe packet will be transmitted. When the source node determines that probing is required based on evaluation of the second probability function (1-PCC), the source node can transmit symbols of the probe packet over a plurality of spatial channels to the destination node. When the source node determines that probing is not required based on evaluation of the second probability function (1-PCC), the source node can transmit symbols of the data packet to the destination node from the plurality of different antennas as a plurality of spatial streams over the plurality of non-correlated spatial channels. When the source node determines that the current value of the PCC function is greater than the lower PCC threshold, the source node can transmit symbols of the probe packet over a plurality of spatial channels to the destination node.

When the source node transmits a probe packet, the source node can then determine whether a probe acknowledgement (ACK) message was received to determine a number of spatial streams to be used for transmission of the data packet. When the source node determines that a probe ACK message was received, the source node can transmit symbols of the data packet to the destination node from the plurality of different antennas as a plurality of spatial streams over a plurality of non-correlated spatial channels. By contrast, when the source node determines that a probe ACK message was not received, the source node can transmit symbols of the data packet to the destination node from a single antenna as a single stream over the single spatial channel.

When the source node transmits symbols of the data packet, it can start an acknowledgement (ACK) timer that specifies a timeout period, and at the end of the time out period the source node can check to determine if it received a data packet acknowledgement (ACK) message, and can then update the PCC function based on whether a data packet ACK message was received.

In one embodiment, the destination node can determine whether symbols of the data packet are successfully received at a plurality of different antennas of the destination node, and can transmit a data packet acknowledgement (ACK) message when the packet was successfully received by the destination node to provide explicit feedback that the transmission over the plurality of spatial streams was successful. After the timeout period expires, the source node can determine whether the data packet ACK message was received. When the data packet ACK message was not received at the source node within the timeout period, the source node can determine that the plurality of spatial channels are correlated as transmission of the plurality of spatial streams was unsuccessful, and can generate a new data point that is used to update the PCC function, where the new data point represents that the plurality of spatial channels are correlated at a particular instant in time. When the data packet ACK message was received at the source node within the timeout period, the source node can determine that the plurality of spatial channels are non-correlated as transmission of the plurality of spatial streams was successful, and can generate a new data point that is used to update the PCC function, where the new data point represents that the plurality of spatial channels are non-correlated at a particular instant in time. The source node can then update the PCC function based on a moving average of the new data point and a number of prior data points to indicate a probability that characterizes a likelihood of whether the plurality of spatial channels are non-correlated. The source node repeats these steps each time a new data packet is transmitted by the source node Prior to describing some embodiments with reference to FIGS. 4 and 5, an example of a wireless communication network 110 that includes a pair of MIMO-enabled nodes 100; an example of a conventional sounding packet method 120 performed at a source or transmitting node 100-1 for selecting a number of spatial streams, and an example of a general purpose MIMO-enabled computing node will now be described with reference to FIGS. 1-3.

FIG. 1 illustrates a wireless communication network 110 that includes a pair of MIMO-enabled nodes 100.

The nodes 100 can generally be wireless devices capable of receiving packetized audio, video and/or data information. Some of the components of a node, such as a processor, a transmitter, a receiver and an antenna, are described below in FIG. 3. The nodes 100 can exchange information as data packets transmitted over carrier frequencies, each of which includes one or more wireless communication channels. The term "MIMO-enabled" refers to the fact that each of the nodes 100 has MIMO and SDM capability, and can be IEEE 802.11n compliant. In this regard, either node 100 could be, for example, an IEEE 802.11n compliant client device or IEEE 802.11n compliant access point (AP).

The nodes 100 typically support simultaneous operation in either infrastructureless mode or infrastructured mode. In this regard, the network 110 of FIG. 1 can be interpreted as operating in an infrastructureless mode (e.g., a client-based peer-to-peer network without infrastructure such as APs and/or cellular base stations), or in an infrastructured mode where one of the nodes 100 is network infrastructure such as an Access Point (AP) or base station. In addition, although not illustrated in FIG. 1, additional MIMO-enabled nodes could be present along a communication path or route between source MIMO-enabled node 100-1 and destination MIMO-enabled node 100-2 such that these nodes 100-1, 100-2 are part of an ad hoc multi-hopping communication network created between nodes 100-1, 100-2, where each intermediate node (not illustrated) has wireless repeater and routing capability. In this case, communications from source node 100-1 can "hop" through each other to other intermediate nodes in the network to reach destination node 100-2.

In this example, for purposes of discussion, MIMO-enabled node 100-1 is a transmitting or source node, and MIMO-enabled node 100-2 is a receiving or destination node. The MIMO-enabled nodes 100-1, 100-2 can communicate information packets with each other over wireless communication medium via antennas 106-1. . . . 106-4. The MIMO-enabled nodes 100-1, 100-2 each have multiple (i.e., two or more) antennas 106-1 . . . 106-4 so that they can coherently resolve more information than would be possible if they were using a single antenna.

As described above, the MIMO-enabled nodes will transmit and receive over multiple spatial streams. However, the transmitting or source MIMO-enabled node 100-1 should not always transmit over a certain fixed number of spaital streams since there is no guarantee that the streams will be non-correlated, and transmitting the frame over correlated streams can result in reception failure at the receiver and thus trigger retransmission thereby resulting in low throughput since the entire packet must be retransmitted. Thus, it is important to avoid transmission usage on correlated channels and to have mechanisms in place for determining the likely number of non-correlated channels that are available before attempting to transmit.

Conventional Sounding Packet Method

Figure 2:
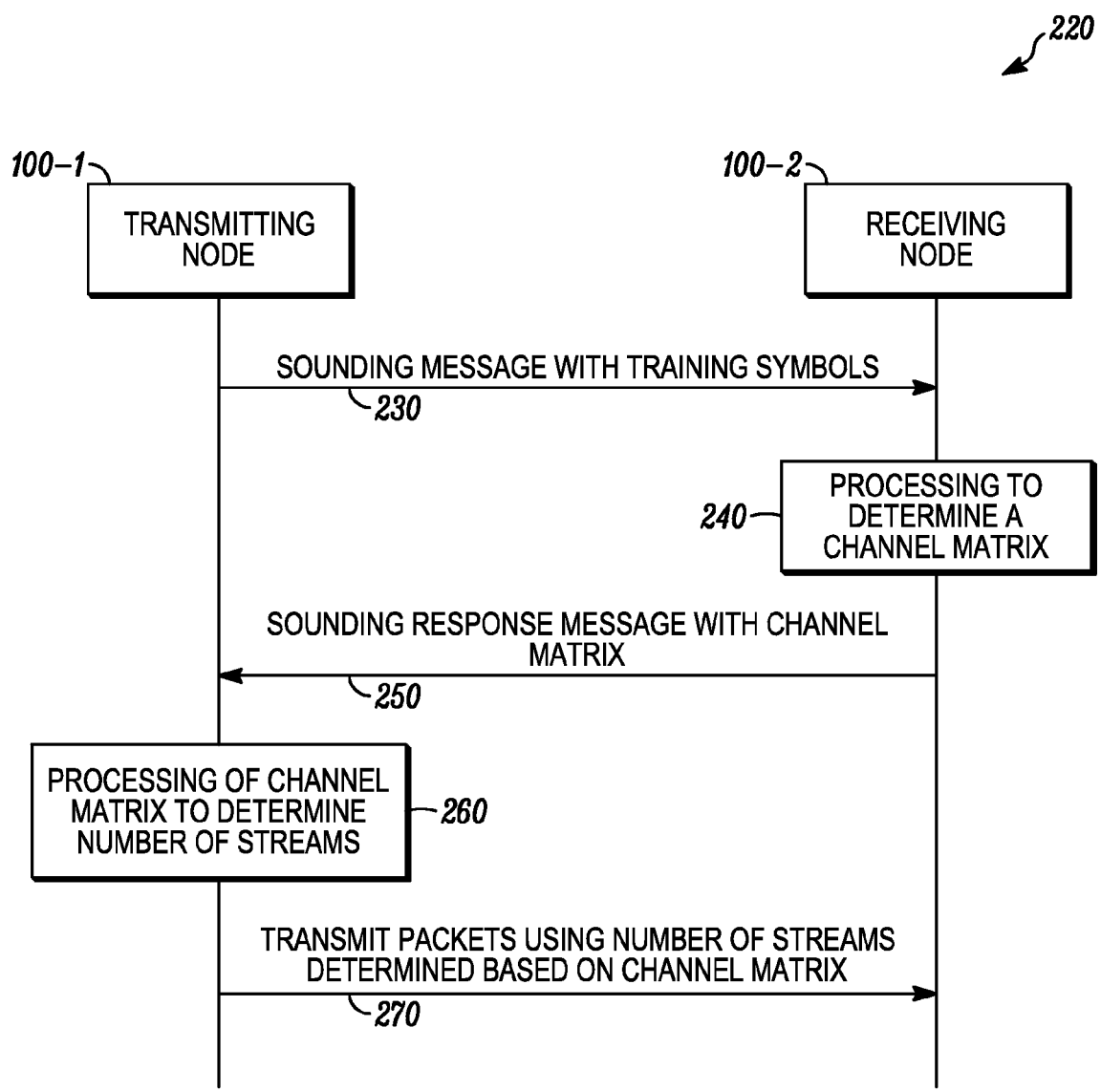
FIG. 2 is message flow diagram illustrating a conventional sounding packet message exchange performed at a source or transmitting node for selecting a number of spaital streams to use for communicating with a destination or receiving node.

FIG. 2 is message flow diagram illustrating a conventional sounding packet message exchange 220 performed at a source or transmitting node 100-1 for selecting a number of spaital streams to use for communicating with a destination or receiving node 100-2. The message exchange 220 is performed by the transmitting node 100-1 and the receiving node 100-2 each time the transmitting node 100-1 prepares to transmit data prior to transmitting that data. The use of sounding packets to acquire channel state information and to determine the number of spatial streams is an optional feature in the IEEE 802.11n draft specification.

Figure 3:
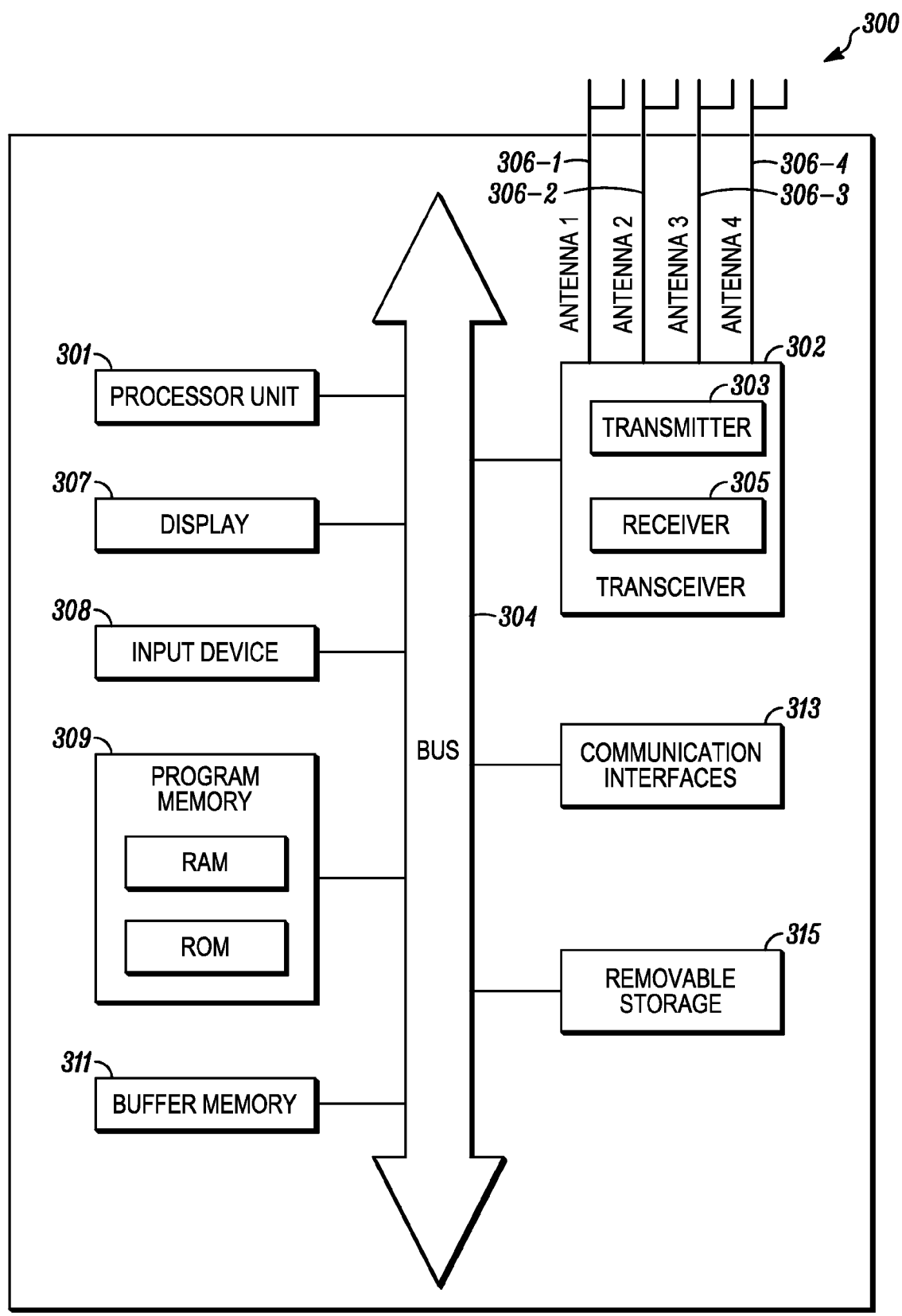
FIG. 3 is a block diagram of a MIMO-enabled node for use in a MIMO wireless network.

Message exchange 220 begins at message 230, where the transmitting node 100-1 transmits a sounding message to the receiving node 100-2. The sounding message includes training symbols that are sent over different antennas of the transmitting node 100-1 to the receiving node 100-2. At block 240, the receiving node 100-2 combines the signals received from the transmitting node 110-1 at each of its antennas and performs complex processing of the training symbols received in each signal to compute a channel matrix of channel state information (CSI). The channel matrix defines the state of channel between each antenna of the transmitting node 110-1 and each antenna of the receiving node 100-2. At message 250, the receiving node 100-2 transmits a sounding response message to the transmitting node 100-1 that includes the channel matrix computed at the receiving node 100-2. At block 260, based on the channel matrix provided in the sounding response message, the transmitting node 100-1 computes the number of non-correlated spaital streams that are available for communications between the transmitting node 100-1 to the receiving node 100-2. At message 270, the transmitting node 100-1 transmits to packets to the receiving node 100-2 using this number of non-correlated spaital streams. Node FIG. 3 is a block diagram of a MIMO-enabled node 300. In one implementation, the MIMO-enabled node 300 is compliant with IEEE 802.11n standard. The node 300 comprises a processor 301, a transceiver 302 including a transmitter circuitry 303 and a receiver circuitry 305, a plurality (two or more) of antennas 306-1 through 306-4, a display 307, an input device 308, a program memory 309 for storing operating instructions that are executed by the processor 301, a buffer memory 311, one or more communication interfaces 313, and a storage unit 315. Although not shown, the node 300 also can include an antenna switch, duplexer, circulator, or other highly isolative means (not shown) for intermittently providing information packets from the transmitter circuitry 303 to the antennas 306 and from the antennas 306 to the receiver circuitry 305. The node 300 can be an integrated unit containing at least all the elements depicted in FIG. 3, as well as any other elements necessary for the node 300 to perform its particular functions. Alternatively, the node 300 can comprise a collection of appropriately interconnected units or devices, wherein such units or devices perform functions that are equivalent to the functions performed by the elements of the node 300. For example, the node 300 can comprise a laptop computer and a wireless local area network (WLAN) card.

The processor 301 can include one or more microprocessors, microcontrollers, DSPs (digital signal processors), state machines, logic circuitry, or any other device or devices that process information based on operational or programming instructions. Such operational or programming instructions can be, for example, stored in the program memory 309. The program memory 309 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 301 has one or more of its functions performed by a state machine or logic circuitry, the memory 309 containing the corresponding operational instructions may be embedded within the state machine or logic circuitry. The operations performed by the processor 301 and the rest of the node 300 are described in detail below.

The transmitter circuitry 303 and the receiver circuitry 305 enable the node 300 to communicate information packets to and acquire information packets from the other nodes. In this regard, the transmitter circuitry 303 and the receiver circuitry 305 include conventional circuitry to enable digital or analog transmissions over a wireless communication channel. The transmitter circuitry 303 and the receiver circuitry 305 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 Worldwide Interoperability for Microwave Access (WiMax), and the like)

The implementations of the transmitter circuitry 303 and the receiver circuitry 305 depend on the implementation of the node 300. For example, the transmitter circuitry 303 and the receiver circuitry 305 can be implemented as an appropriate wireless modem, or as conventional transmitting and receiving components of two-way wireless communication devices. In the event that the transmitter circuitry 303 and the receiver circuitry 305 are implemented as a wireless modem, the modem can be internal to the node 300 or insertable into the node 300 (e.g., embodied in a wireless radio frequency (RF) modem implemented on a Personal Computer Memory Card International Association (PCMCIA) card). For a wireless communication device, the transmitter circuitry 303 and the receiver circuitry 305 can be implemented as part of the wireless device hardware and software architecture in accordance with known techniques. Most, if not all, of the functions of the transmitter circuitry 303 and/or the receiver circuitry 305 can be implemented in a processor, such as the processor 301. However, the processor 301, the transmitter circuitry 303, and the receiver circuitry 305 have been artificially partitioned herein to facilitate a better understanding.

The receiver circuitry 305 is capable of receiving radio frequency (RF) signals from at least one bandwidth and optionally multiple bandwidths, if the communications with the proximate device are in a frequency band other than that of the network communications. The receiver circuitry 305 can optionally comprise a first receiver and a second receiver, or one receiver capable of receiving in two or more bandwidths. The transceiver 302 includes at least one set of transmitter circuitry 303. The at least one transmitter 303 may be capable of transmitting to multiple devices on multiple frequency bands. As with the receiver 305, dual transmitters 303 may optionally be employed where one transmitter is for the transmission to a proximate node or direct link establishment to WLANs and the other transmitter is for transmission to a cellular base station, for example.

The antennas 306-1 through 306-4 can be any known or developed structure for radiating and receiving electromagnetic energy in the frequency range containing the wireless carrier frequencies. In this implementation, four antennas are shown; however, in other embodiments two or more antennas can be utilized. In a MIMO system the channel capacity is increased as the number of antennas is increased, proportional to the minimum number of transmit and receive antennas. A high rate signal is split into multiple lower rate streams and each stream is transmitted from a different transmit antenna in the same frequency channel. If these signals arrive at the receiver antenna array with sufficiently different spatial signatures, the receiver can separate these streams, creating parallel channels for free. Spatial multiplexing is a very powerful technique for increasing channel capacity at higher Signal to Noise Ratio (SNR).

The buffer memory 311 can be any form of volatile memory, such as Random Access Memory (RAM), and is used for temporarily storing received information packets in accordance with the present invention.

When the node 300 is constructed to receive video information from a video source, the node 300 further can include a video decoder capable of decoding the current Moving Picture Experts Group (MPEG) standard or some other video decoding standard. When the node 300 is further capable of transmitting video information, the node 300 further can include a video encoder capable of encoding the video data into at least one of the foregoing video standards. Such video encoder and decoder can be, for example, implemented as part of the processor 301.

Overview

It is desirable for the source MIMO-enabled node 100-1 to have an efficient way to intelligently determine how many non-correlated spatial streams are available and then select this number of non-correlated spaital streams for communications with the destination MIMO-enabled node 100-2. According to the conventional sounding packet message exchange 220 described above, before the source node 100-1 can transmit, the destination node 100-2 must compute a full channel matrix and provide it to the source node 100-1 so that source node 100-1 can determine modulation and number of streams to use for the transmission. However, this approach results in a lot of air time overhead as well as lot of hardware complexity at the receiving node 100-2. The sounding packet message exchange is CPU intensive. The amount of processing and hardware complexity and cost that are required with the sounding packet method are significant drawbacks. This is an expensive and complex technology and many chipsets will not support this feature. Many vendors do not provide hardware needed to support this optional functionality specified in IEEE 802.11n.

As such, it would be desirable to provide improved methods for selecting a number of spaital streams to use. It would be desirable to provide efficient methods for selecting a number of spaital streams to use, which are not overly complex from a hardware perspective. It would also be desirable if such methods considered transient channel conditions and explicitly considered large packet losses due to channel correlations.

A method 500 for selecting a number of spaital streams to use will be described below with respect to FIG. 5. As part of this method 500, a Probability of Channel non-Correlation (PCC) function is used. Prior to describing this method 500 a method for generating and updating the PCC function will be described with reference to FIG. 4.

Probability of Channel non-Correlation (PCC) Function

Figure 4:
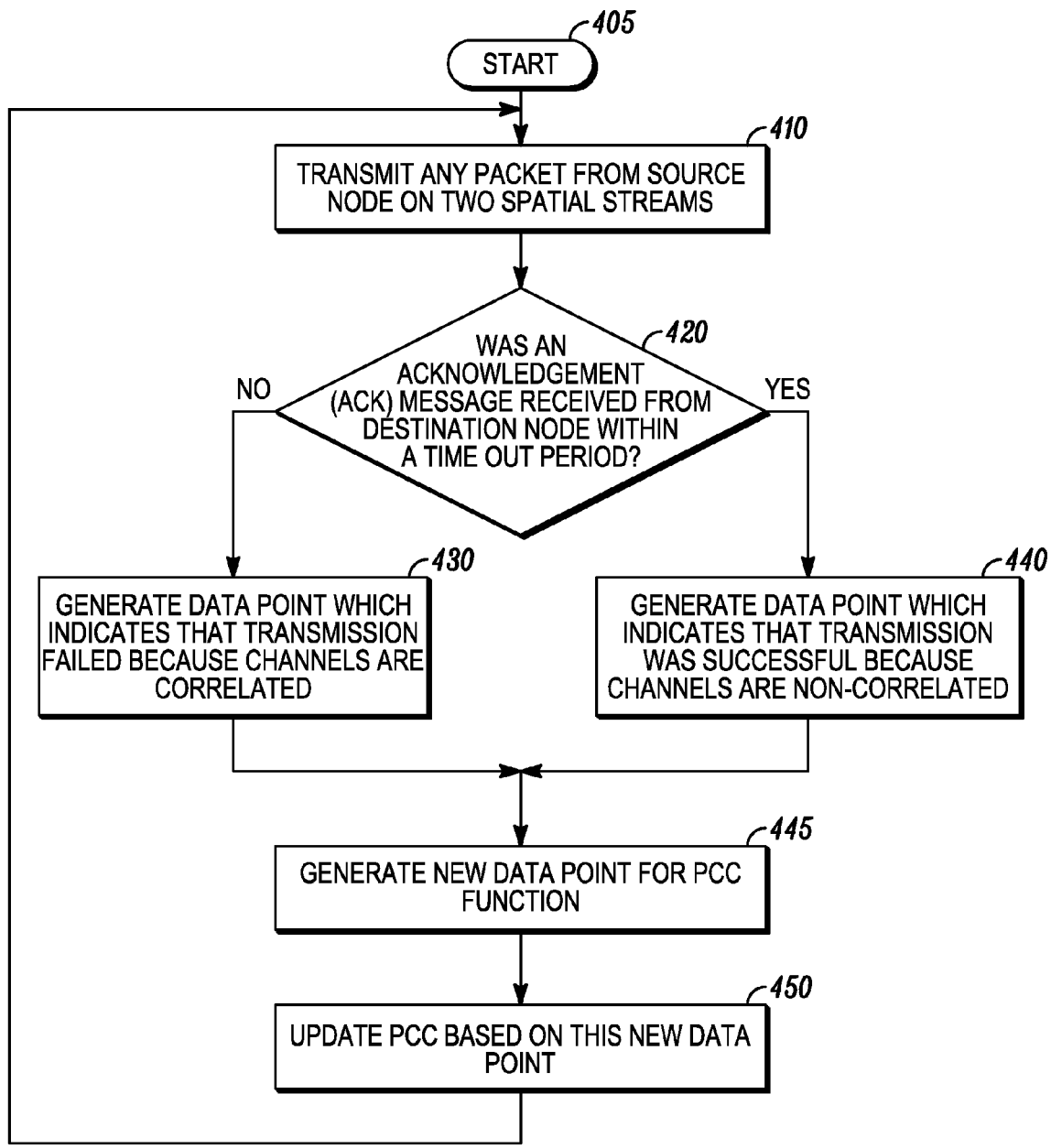
FIG. 4 is flow chart illustrating a method performed at a source node for generating a Probability of Channel non-Correlation (PCC) function in accordance with some embodiments.

FIG. 4 is flow chart illustrating a method 400 performed at a source node for generating a Probability of Channel non-Correlation (PCC) function that is used in accordance with some embodiments.

At a given instant in time, any a given group of spatial channels will either be correlated or non-correlated. Because this correlation status can change at any given instant, the source node 100-1 has no way of absolutely knowing the status at that given instant. To provide a mechanism for deciding whether a group of spatial channels are correlated or non-correlated at any given instant, the source node 100-1 can generate and maintain a statistical function called a Probability of Channel non-Correlation (PCC) based on feedback from the destination node 100-2. In general, the PCC indicates the probability that channels are non-correlated. The value of the PCC at any instant in time provides a measure of likelihood or probability that a set of channels are non-correlated at that time. For example, if PCC=90% (ninety percent) for a set of two spatial channels at a particular instant in time, then the probability that those two channels are non-correlated (and that packets transmitted by the source node 100-1 on two streams via those channels will be successfully received at the destination node 100-2) is 90%.

The method 400 for generating a PCC function starts at step 405.

At step 410, the source node 100-1 transmits a packet from a plurality of different antennas as a plurality of spatial streams over a plurality of spatial channels. The packet transmitted at step 410 can be any type of packet that is acknowledged by its recipient. For example, the packet can be a data packet, a probe packet or any other type of packet that is acknowledged by its recipient. When the source node 100-1 transmits it starts an acknowledgement (ACK) timer that specifies a timeout period. As described below, if an ACK message is not received within the timeout period, the source node 100-1 interprets this as meaning that this transmission was not successful. If an ACK message was received within the timeout period, the source node 100-1 interprets this as meaning that this transmission was successful.

In the following description a method for determining whether a set of spatial channels are non-correlated is provided, and in this description it the set of spatial channels includes two spatial channels. As such, in this particular embodiment, method 400 will be described with respect to a 2×2 MIMO system where the source node 100-1 and the destination node 100-2 each have two antennas and can potentially communicate via two spatial streams. However, it will be appreciated that the method 500 can be implemented in other MIMO systems that use any practical number of antennas, spatial streams and channels (e.g., 4×4 MIMO systems).

After the source node 100-1 transmits the packet using two spatial streams over the two spatial channels, the symbols that make up this packet can potentially be received at two different antennas of the destination node 100-2.

When the packet was successfully received by the destination node 100-2, the destination node 100-2 transmits an ACK message to the source node 100-1 to provide explicit feedback that the transmission over both streams was successful. When packet was not successfully received on two streams by the destination node 100-2, then the destination node 100-2 does nothing and the source node 100-1 does not receive an ACK message. In this case, because the source node 100-1 does not receive an ACK message within the timeout period, the source node 100-1 can implicitly determine that transmission over both streams was not successful.

Thus, after the timeout period expires, the source node 100-1 determines at step 420 whether an acknowledgement (ACK) message was received from the destination node 100-2.

When the source node 100-1 does not receive an ACK message from the destination node 100-2, at step 430 the source node 100-1 interprets this as implicitly meaning that transmission failed because the two channels are correlated. The method 400 proceeds to step 445, where the source node 100-1 generates a new data point that is used to update the PCC function and method 400 proceeds to step 450.

By contrast, when the source node 100-1 receives an ACK message from the destination node 100-2, at step 440 the source node 100-1 interprets this as explicitly meaning that transmission was successful and that the two channels are non-correlated. The method 400 proceeds to step 445, where the source node 100-1 generates a new data point that is used to update the PCC function and method 400 proceeds to step 450.

At step 450, the source node 100-1 updates the current PCC based on the new data point or "feedback" provided at step 430 or step 440, and the method 400 loops back to step 410. Each instance of feedback is a new data point that is used to compute an updated PCC. The PCC can be computed as a moving average. For example, if PCC is determined over a window of ten (10) sample data points and the last 10 sample data points include one sample data point which indicated that the two channels are correlated and nine (9) sample data points which indicated that the two channels are non-correlated, then PCC would be 90% over that window at that particular time instant. Alternatively, the PCC can be computed as a weighted moving average of recent data points, where each of the data points represent whether two channels are non-correlated at a particular instant in time. As indicated by the feedback loop out of step 450, each time the source node 100-2 transmits a packet a new data point is generated for updating the PCC. In other words, the source node 100-1 updates the PCC function each time it transmits such that the PCC is continuously updated each time a new data point is determined at step 430 or 450.

As will now be described, the instantaneous or current value of the PCC function can be used at a source node 100-1 to select a number of spaital streams.

Selection of Number of Spaital Streams

Figure 5:
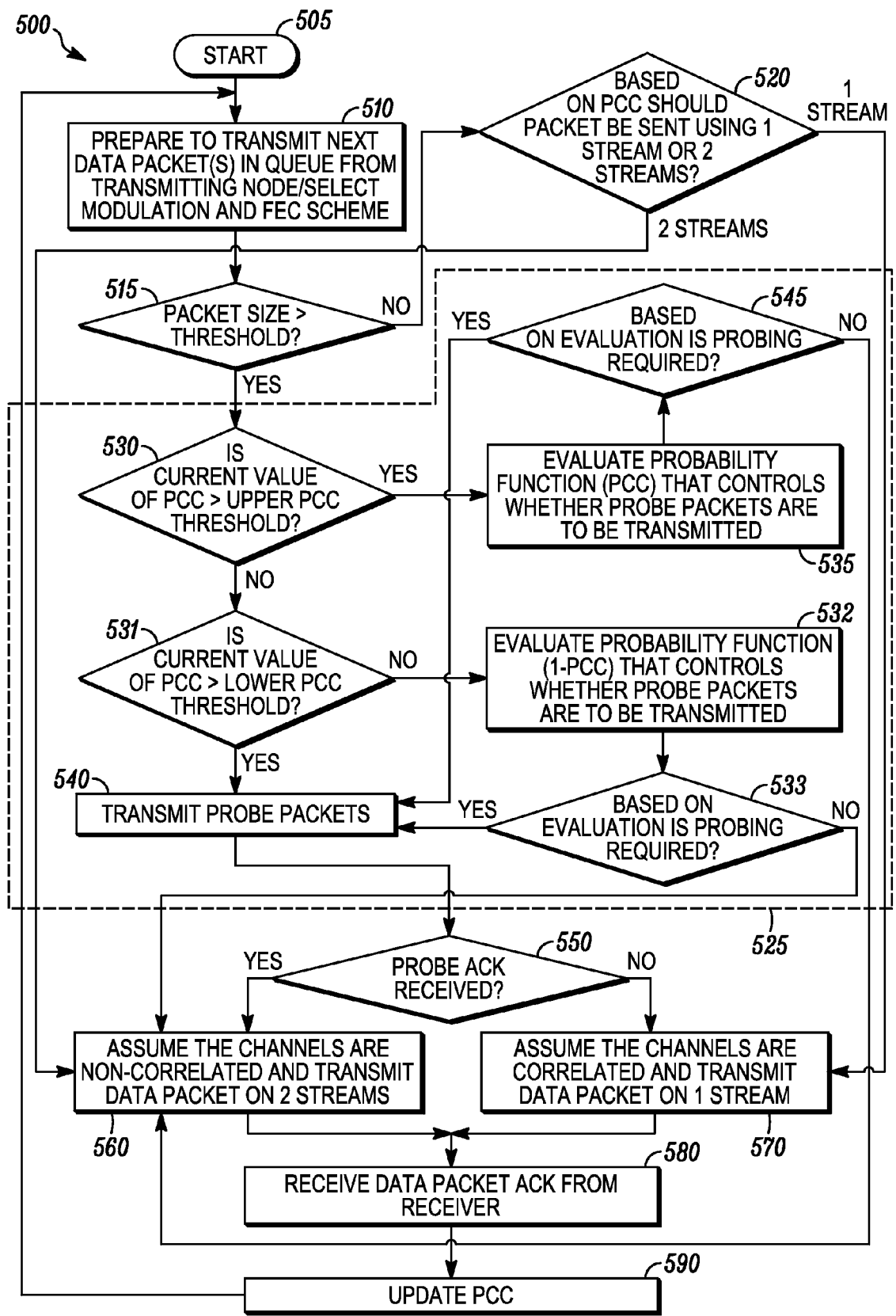
FIG. 5 is flow chart illustrating a method performed at a source node for selecting a number of spaital streams to use for communicating with a destination node in accordance with some other embodiments.

FIG. 5 is flow chart illustrating a method 500 performed at a source node 100-1 for selecting a number of spaital streams to use for communicating with a destination node 100-2 in accordance with some other embodiments. As above, in this particular implementation of method 500 will be described with respect to a 2×2 MIMO system where the source node 100-1 and the destination node 100-2 each have two antennas and can potentially communicate via two spatial streams. However, it will be appreciated that the method 500 generally applies to any MIMO systems that uses any number of spatial streams (e.g., 4×4 MIMO systems). In short, method 500 can be sub-divided into 5 sub-steps: step 510, steps specified at block 525, steps 550-570, step 580 and step 590. Steps specified at block 525 provide a method for determining whether explicit probing is needed to determine a number of streams to be used for the next transmission. Steps 560 and 570 specify how many streams are to be used for the next transmission. Step 590 specifies how PCC function is updated based on information obtained and generated at steps 550-580.

Method 500 begins at step 505 and proceeds to step 510 where the source node prepares to transmit a next aggregated packet in the transmission queue, and selects a modulation scheme and forward error correction (FEC) scheme for this aggregated packet. In some instances the aggregated packet can be made up of a group of smaller packets. Any modulation and FEC selection mechanism can be used. For instance, in one implementation, the modulation and FEC selection mechanism can be a packet completion rate (PCR)-based selection mechanism based on retransmission statistics. In another implementation, the modulation and FEC selection mechanism can be an RSSI-based selection mechanism. In another implementation, the modulation and FEC selection mechanism can be a stochastic selection mechanism based on throughput.

Method 500 then proceeds to step 515, where the source node determines whether a packet size (in bytes) of the aggregated packet is greater than a packet size threshold. Depending upon the aggregated packet size and PCC, probe packets are (or are not) sent on to determine the channel state. Because probe packet incur some overhead, the decision of whether (or not) to transmit probe packets depends on the size of the packet.

When the source node determines that the data packet size (in bytes) is not greater than the packet size threshold, the method 500 proceeds to step 520, where the source node 100-1 determines whether the instantaneous or current value of the PCC function is greater than a threshold to determine whether the packet should be sent/transmitted using one stream or two streams. Thus, if the data packet is small, then the PCC value can be used to decide the number of streams that are to be used to transmit this small data packet. If PCC is greater than a threshold, the source node 100-1 will transmit two streams; otherwise it will transmit one stream. When the source node determines that the instantaneous or current value of the PCC function is greater than the threshold and that the packet should be transmitted using two streams, then the method 500 proceeds to step 560, where the source node transmits the packet on two streams. By contrast, when the source node determines that the instantaneous or current value of the PCC function is at or below the threshold and that the packet should be transmitted using one stream, the method 500 proceeds to step 570, where the source node transmits the packet on one stream. Following either step 560 or 570, the method 500 proceeds to step 580, which is described below.

When the source node determines at step 515 that the packet size (in bytes) of the aggregated packet is greater than a packet size threshold, the method 500 proceeds to block 525 to determine whether probing is required. At block 525, probe packets can be used to determine whether the channels are correlated and non-correlated. More specifically, a probe packet can be used to determine instantaneous channel conditions which can tell whether two streams are present or not. As will be explained below, the decision of whether to transmit probe packets is based on the current value of the PCC function. In other words, when the source node 100-1 has a large data packet in the queue, as described below with respect to block 525, the source node 100-1 can use a current or instantaneous value of the PCC function to decide whether or not to probe (i.e., send probe packets on two streams). Described differently, if the data packet is "big," then probing can be used to determine number of spatial streams that should be used to transmit it. Thus, only when the data packet in the transmission queue is bigger than the packet size threshold, can a probe packet be generated and possibly transmitted over two spatial streams. When the data packet is "small," there is no point in generating probe packets, and, as noted above with respect to step 520, the source node 100-1 can directly use the current or instantaneous PCC value to decide if this small packet should be transmitted on one or two spatial streams.

At step 530, the source node can determine whether the current value of the PCC function is greater than an upper PCC threshold. While PCC changes over time, the probability function (1-PCC) can provide a general measure of channel correlation or non-correlation.

When the source node determines at step 530 that the PCC value is not greater than the upper PCC threshold at step 530, the method 500 proceeds to step 531, where the source node determines whether the PCC value is greater than a lower PCC threshold at step 531. When the source node determines at step 531 that the current PCC value is greater than the lower PCC threshold at step 531, the method 500 proceeds to step 540, where the source node transmits a probe packet on two streams, and the method 500 proceeds to step 550, where the source node determines whether a probe acknowledgement (ACK) message was received. To explain further, each probe packet (or any other packet) is made up of symbols. When the probe packet is transmitted on two streams, instead of transmitting these symbols from one antenna as one stream, the source node 100-1 splits the probe packet into two sets of symbols and transmits each set of symbols via two antennas over two streams. When probing is used (e.g., when PCC=80%), throughput is significantly higher.

By contrast, when the source node determines that the current PCC value is less than or equal to the lower PCC threshold at step 531, the method 500 proceeds to step 532, where the source node evaluates a probability function (1-PCC) that controls whether probe packets are to be transmitted. The probability function (1-PCC) biases the likelihood of transmitting the probe packet and can be used to determine whether the probe packet will be sent or not. In other words, the evaluation of this probability function randomly decides whether the probe packet should be transmitted. For instance, if the current value of PCC is equal to 50%, then 1-PCC is equal to 50% meaning that there is a 50% chance or probability that the source node 100-1 will transmit a probe packet over the two streams. By contrast, if the current value of the PCC function is 70%, then 1-PCC is equal to 30% and a probe packet will only be transmitted 30% of the time and 70% of the time no probe packets will be sent.

Based on this evaluation, the method 500 then proceeds to step 533 where the source node determines whether probing is required (i.e., whether the probe packet is to be transmitted over two streams). When the source node determines that probing is not required based on the evaluation in step 532 and that the probe packet should not be sent/transmitted, the method 500 proceeds to step 570, where the source node transmits the data packet on one stream, and then proceeds to step 580 described below. When the source node determines that probing is required based on the evaluation in step 532 and that the probe packet is to be sent/transmitted on two streams, the method 500 proceeds to step 540, where the source node transmits the probe packets, and the method proceeds to step 550, where the source node determines whether a probe acknowledgement (ACK) message was received.

By contrast, when the source node determines that the instantaneous value of the PCC function is greater than the upper PCC threshold at step 530, the method 500 proceeds to step 535, where the source node evaluates another probability function (PCC) that controls whether probe packets are to be transmitted. The probability function (PCC) biases the likelihood of transmitting the probe packet and can be used to determine whether the probe packet will be sent or not. In other words, the evaluation of this probability function randomly decides whether the probe packet should be transmitted. In one implementation, this decision is based on a random number that depends on the value of the probability function (PCC). Logic at the source node 100-1 allows the source node to randomly decide whether to transmit (or not to transmit) the probe packet based on the current or instantaneous value of the probability function (PCC).

Based on this evaluation at step 535, the method 500 then proceeds to step 545 where the source node determines whether the probe packet is to be transmitted over two streams. When the source node determines that probing is not required based on the evaluation in step 535 and that the probe packet should not be sent/transmitted, the method 500 proceeds to step 560, where the source node transmits the data packet on two streams, and then proceeds to step 580 described below. When the source node determines that probing is required based on the evaluation in step 535 and that the probe packet is to be sent/transmitted on two streams, the method 500 proceeds to step 540, where the source node transmits the probe packets, and the method proceeds to step 550, where the source node determines whether a probe acknowledgement (ACK) message was received.

When the source node determines that a probe ACK message was received at step 550, the method proceeds to step 560, where the source node determines that the spatial channels are non-correlated and transmits the packet on two streams, and then proceeds to step 580. By contrast, when the source node determines that a probe ACK message was not received at step 550, the method 500 proceeds to step 570, where the source node determines that the spatial channels are correlated and transmits the packet on one stream, and then proceeds to step 580.

At step 580, the source node receives a data packet acknowledgement (ACK) message, and then updates the PCC function at step 590. The PCC function can be updated using any of the methods described above with respect to FIG. 4. The method 500 then loops back to step 510 where the method 500 repeats.

Thus, the disclosed embodiments can provide techniques for determining the number of streams to be used for the packet transmissions. These techniques allow a transmitting node to intelligently transmit packets (deterministically or stochastically) using multiple streams when there is a strong likelihood that multiple streams are non-correlated and using a single stream when there is likelihood that multiple streams are correlated. This can protect against throughput degradation due to poor stream selection when channels are likely to be correlated and can help reduce the need for retransmission of large aggregated frames.

Thus, the disclosed embodiments provide an alternative to the optional sounding packet message exchange specified in the IEEE 802.11n. In the disclosed embodiments, there is no need for the receiver to compute and send a complex channel matrix back to the transmitter, and no need for the transmitter to use the channel matrix to determine whether the two channels are non-correlated. The disclosed embodiments do not require additional hardware that would be needed to support the optional sounding packet message exchange functionality specified in IEEE 802.11n. Rather, the disclosed embodiments can be used with existing hardware. The transmitter simply uses ACKs (or the absence thereof) to determine if each of the spatial channels are correlated or non-correlated, and computes a probability function based on those ACKs (or absence thereof) which characterizes the probability that the spatial channels are non-correlated.

Moreover, by combining stream selection with any existing modulation selection techniques, a complete rate selection mechanism is provided for MIMO systems such as those that comply with IEEE 802.11n. This data rate selection happens for each packet that transmitter transmits. Finding streams will be one of the steps in order to find the optimal data rate between two nodes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
   generating a Probability of Channel non-Correlation (PCC) function at a source node that indicates a probability of whether a plurality of spatial channels are non-correlated based on feedback from a destination node;
   determining a packet size of a data packet to be transmitted by the source node when the source node prepares to transmit the data packet, wherein the data packet comprises symbols;
   determining, at a source node before the source node transmits the data packet to the destination node, whether a packet size of the data packet is greater than a packet size threshold; and
   determining, at the source node when the packet size of the data packet is less than or equal to the packet size threshold, whether a current value of the PCC function is greater than a first threshold;
   when the current value of the PCC function is greater than the first threshold:
      selecting, at the source node, a plurality of non-correlated spatial channels to be used for transmission of the data packet to the destination node, and
      transmitting symbols of the data packet from a plurality of different antennas as a plurality of spatial streams over the plurality of non-correlated spatial channels.

2. A method according to claim 1, further comprising:
   selecting, at the source node, a single one of the spatial channels to be used for transmission of the data packet to the destination node when the current value of the PCC function is less than or equal to the first threshold, and transmitting the symbols of data packet from a single antenna of the source node as a single stream over the single spatial channel.

3. A method according to claim 1, when the packet size of the data packet is greater than the packet size threshold, further comprising:
   determining, at the source node based on a current value of the PCC function, whether to transmit a probe packet;
   transmitting symbols of the probe packet, from the source node to the destination node, via a plurality of spatial streams over a plurality of spatial channels to generate a data point that characterizes the likelihood of channel non-correlation;
   determining, at the source node, whether a probe acknowledgement (ACK) message was received to determine a number of spatial streams to be used for transmission of the data packet;

transmitting symbols of the data packet, from the source node to the destination node, from the plurality of different antennas as a plurality of spatial streams over a plurality of non-correlated spatial channels when the source node determines that a probe ACK message was received, and transmitting symbols of the data packet, from the source node to the destination node, from the single antenna of the source node as a single stream over the single spatial channel when the source node determines that a probe ACK message was not received.

4. A method according to claim 3, wherein determining, at the source node based on a current value of the PCC function, whether to transmit a probe packet comprises:

determining, at the source node, whether a current value of the PCC function is greater than an upper PCC threshold;

when the source node determines that the current value of the PCC function is greater than the upper PCC threshold, randomly determining, at the source node, whether probing is required based on evaluation of a first probability function (PCC) that that provides a general measure of channel non-correlation and biases the probability of whether a probe packet will be transmitted; and transmitting, from the source node, symbols of the probe packet over a plurality of spatial channels to the destination node when the source node determines that probing is required based on evaluation of the first probability function (PCC).

5. A method according to claim 4, further comprising: transmitting symbols of the data packet, from the source node to the destination node, from the plurality of different antennas as a plurality of spatial streams over a plurality of non-correlated spatial channels when the source node determines that probing is not required based on evaluation of the first probability function (PCC).

6. A method according to claim 3, wherein the step of determining, at the source node based on a current value of the PCC function, whether to transmit a probe packet, further comprises:

determining, at the source node, whether a current value of the PCC function is greater than an upper PCC threshold;

when the source node determines that the current value of the PCC function is less than or equal to the upper PCC threshold, determining, at the source node, whether the current value of the PCC function is greater than a lower PCC threshold;

when the source node determines that the current value of the PCC function is less than or equal to the lower PCC threshold, randomly determining, at the source node, whether probing is required based on evaluation of a second probability function (1-PCC) that provides a general measure of channel correlation and biases the probability of whether a probe packet will be transmitted;

transmitting, from the source node, symbols of the probe packet over a plurality of spatial channels to the destination node when the source node determines that probing is required based on evaluation of the second probability function (1-PCC).

7. A method according to claim 6, further comprising: transmitting symbols of the data packet, from the source node to the destination node, from the plurality of different antennas as a plurality of spatial streams over the plurality of non-correlated spatial channels when the source node determines that probing is not required based on evaluation of the second probability function (1-PCC).

8. A method according to claim 6, further comprising:
transmitting, from the source node, symbols of the probe packet over a plurality of spatial channels to the destination node when the source node determines that the current value of the PCC function is greater than the lower PCC threshold.

9. A method according to claim 1, further comprising:
receiving, at the source node, a data packet acknowledgement (ACK) message; and
updating the PCC function at the source node when a data packet ACK message is received.

10. A method according to claim 9, further comprising:
starting an acknowledgement (ACK) timer at the source node that specifies a timeout period upon transmitting symbols of the data packet.

11. A method according to claim 10, wherein updating the PCC function at the source node when a data packet ACK message is received, comprises:

determining, at the destination node, whether symbols of the data packet are successfully received at a plurality of different antennas of the destination node; and transmitting, from the destination node, a data packet acknowledgement (ACK) message when the packet was successfully received by the destination node to provide explicit feedback that the transmission over the plurality of spatial streams was successful;

determining, at the source node after the timeout period expires, whether the data packet ACK message was received;

determining, at the source node when the data packet ACK message was not received at the source node within the timeout period, that the plurality of spatial channels are correlated as transmission of the plurality of spatial streams was unsuccessful, and generating a new data point that is used to update the PCC function, where the new data point represents that the plurality of spatial channels are correlated at a particular instant in time;

determining, at the source node when the data packet ACK message was received at the source node within the timeout period, that the plurality of spatial channels are non-correlated as transmission of the plurality of spatial streams was successful, and generating a new data point that is used to update the PCC function, where the new data point represents that the plurality of spatial channels are non-correlated at a particular instant in time; and updating, at the source node, the PCC function based on a moving average of the new data point and a number of prior data points to indicate a probability that characterizes a likelihood of whether the plurality of spatial channels are non-correlated.

12. A method according to claim 11, further comprising: repeating the operations of claim 11 each time a new data packet is transmitted by the source node.

13. A method according to claim 1, wherein determining a packet size of a data packet to be transmitted by the source node, comprises:

selecting, at the source node, a modulation scheme, a forward error correction (FEC) scheme and a date rate to be used for transmission of a data packet when the source node prepares to transmit the data packet; and determining a packet size of the data packet based on the modulation scheme, the FEC scheme and the date rate.

14. A method according to claim 1, wherein the current value of the PCC function being greater than the first threshold implies that the plurality of non-correlated spaital channels are available for communication with the destination node, and wherein the current value of the PCC function being less than or equal to the first threshold implies that the number of spaital channels for communication with the destination node are correlated.

15. A method according to claim 1, wherein the plurality of spatial streams comprise two spatial streams and wherein the plurality of non-correlated spatial channels comprise two non-correlated spatial channels, and wherein determining whether a current value of the PCC function is greater than a first threshold comprises:
determining, at the source node when the packet size of the data packet is less than or equal to the packet size threshold, whether a current value of the PCC function is greater than a first threshold to determine whether the data packet is to be transmitted using one stream or two spatial streams; and
wherein transmitting symbols of the data packet from the plurality of different antennas as the plurality of spatial streams over the plurality of non-correlated spatial channels comprises:
transmitting symbols of the data packet to the destination node from two different antennas as two spatial streams over the two non-correlated spatial channels when the current value of the PCC function is determined to be greater than the first threshold.

16. A method according to claim 1, wherein the source node and the destination node are multiple input multiple output (MIMO) enabled, and wherein the source node and the destination node both include multiple antennas.

17. A method according to claim 1, wherein generating a Probability of Channel non-Correlation (PCC) function at the source node further comprises:
transmitting the data packet from the source node and starting an acknowledgement (ACK) timer;
determining, at the source node upon expiration of the ACK timer, whether a data packet acknowledgement (ACK) message was received by the source node; and
updating the PCC function at the source node based on whether the data packet ACK message was received.

18. A method according to claim 17, further comprising:
determining, at the destination node, whether symbols of the data packet are successfully received at a plurality of different antennas of the destination node;
transmitting, from the destination node, a data packet acknowledgement (ACK) message when the packet was successfully received by the destination node to provide explicit feedback that the transmission over the plurality of spatial streams was successful;
determining, at the source node after the timeout period expires, whether the data packet ACK message was received;
determining, at the source node when the data packet ACK message was not received at the source node within the timeout period, that the plurality of spatial channels are correlated as transmission of the plurality of spatial streams was unsuccessful, and generating a new data point that is used to update the PCC function, where the new data point represents that the plurality of spatial channels are correlated at a particular instant in time;
determining, at the source node when the data packet ACK message was received at the source node within the timeout period, that the plurality of spatial channels are non-correlated as transmission of the plurality of spatial streams was successful, and generating a new data point that is used to update the PCC function, where the new data point represents that the plurality of spatial channels are non-correlated at a particular instant in time; and
wherein the step of updating the PCC function at the source node based on whether the data packet ACK message was received, comprises:
updating, at the source node, the PCC function based on a moving average of the new data point and a number of prior data points to indicate a probability that characterizes a likelihood of whether the plurality of spatial channels are non-correlated.

19. A method according to claim 18, further comprising:
repeating operations of claim 18 each time a new data packet is transmitted by the source node.

20. A method, comprising:
generating a Probability of Channel non-Correlation (PCC) function at a source node that indicates a probability of whether a plurality of spatial channels are non-correlated based on feedback from a destination node;
determining a packet size of a data packet to be transmitted by the source node when the source node prepares to transmit the data packet, wherein the data packet comprises symbols;
determining, at a source node before the source node transmits the data packet to the destination node, whether a packet size of the data packet is greater than a packet size threshold;
when the packet size of the data packet is greater than the packet size threshold, determining, at the source node based on a current value of the PCC function, whether to transmit a probe packet; and
transmitting symbols of the probe packet, from the source node to the destination node, via a plurality of spatial streams over a plurality of spatial channels to generate a data point that characterizes the likelihood of channel non-correlation.

21. A method according to claim 20, further comprising:
determining, at the source node, whether a probe acknowledgement (ACK) message was received to determine a number of spatial streams to be used for transmission of the data packet; and
transmitting symbols of the data packet, from the source node to the destination node, from a plurality of different antennas as a plurality of spatial streams over a plurality of non-correlated spatial channels when the source node determines that a probe ACK message was received.

22. A method according to claim 20, further comprising:
transmitting symbols of the data packet, from the source node to the destination node, from a single antenna of the source node as a single stream over the single spatial channel when the source node determines that a probe ACK message was not received.

23. A method according to claim 20, further comprising:
determining, at the source node when the packet size of the data packet is less than or equal to the packet size threshold, whether a current value of the PCC function is greater than a first threshold;
selecting, at the source node, plurality of non-correlated spatial channels to be used for transmission of the data packet to the destination node when the current value of the PCC function is greater than the first threshold; and
transmitting symbols of the data packet from a plurality of different antennas as a plurality of spatial streams over a plurality of non-correlated spatial channels, wherein the current value of the PCC function being greater than the first threshold implies that the plurality of non-correlated spaital channels are available for communication with the destination node.

24. A method according to claim 23, further comprising:
selecting, at the source node, a single one of the spatial channels to be used for transmission of the data packet to the destination node when the current value of the PCC function is less than or equal to the first threshold; and
transmitting the symbols of data packet from a single antenna of the source node as a single stream over the single spatial channel, wherein the current value of the PCC function being less than or equal to the first threshold implies that the number of spaital channels for communication with the destination node are correlated.

25. A method according to claim 20, wherein determining, at the source node based on a current value of the PCC function, whether to transmit a probe packet comprises:
determining, at the source node, whether a current value of the PCC function is greater than an upper PCC threshold;
when the source node determines that the current value of the PCC function is greater than the upper PCC threshold, randomly determining, at the source node, whether probing is required based on evaluation of a first probability function (PCC) that that provides a general measure of channel non-correlation and biases the probability of whether a probe packet will be transmitted; and
transmitting, from the source node, symbols of the probe packet over a plurality of spatial channels to the destination node when the source node determines that probing is required based on evaluation of the first probability function (PCC).

26. A method according to claim 25, further comprising:
transmitting symbols of the data packet, from the source node to the destination node, from the plurality of different antennas as a plurality of spatial streams over a plurality of non-correlated spatial channels when the source node determines that probing is not required based on evaluation of the first probability function (PCC).

27. A method according to claim 26, wherein determining, at the source node based on a current value of the PCC function, whether to transmit a probe packet, further comprises:
determining, at the source node, whether a current value of the PCC function is greater than an upper PCC threshold;
when the source node determines that the current value of the PCC function is less than or equal to the upper PCC threshold, determining, at the source node, whether the current value of the PCC function is greater than a lower PCC threshold;
when the source node determines that the current value of the PCC function is less than or equal to the lower PCC threshold, randomly determining, at the source node, whether probing is required based on evaluation of a second probability function (1-PCC) that provides a general measure of channel correlation and biases the probability of whether a probe packet will be transmitted; and
transmitting, from the source node, symbols of the probe packet over a plurality of spatial channels to the destination node when the source node determines that probing is required based on evaluation of the second probability function (1-PCC).

28. A method according to claim 27, further comprising:
transmitting symbols of the data packet, from the source node to the destination node, from the plurality of different antennas as a plurality of spatial streams over the plurality of non-correlated spatial channels when the source node determines that probing is not required based on evaluation of the second probability function (1-PCC).

29. A method according to claim 27, further comprising:
transmitting, from the source node, symbols of the probe packet over a plurality of spatial channels to the destination node when the source node determines that the current value of the PCC function is greater than the lower PCC threshold.

30. A method according to claim 20, further comprising:
receiving, at the source node, a data packet acknowledgement (ACK) message; and
updating the PCC function at the source node when a data packet ACK message is received.

* * * * *

UNITED STATES PATENT AND TRADEMARK OFFICE
CERTIFICATE OF CORRECTION

PATENT NO. : 8,203,928 B2  
APPLICATION NO. : 12/415723  
DATED : June 19, 2012  
INVENTOR(S) : Aggarwal et al.

Page 1 of 1

It is certified that error appears in the above-identified patent and that said Letters Patent is hereby corrected as shown below:

In Column 3, Line 22, delete "spaital" and insert -- spatial --, therefor at each occurrence throughout the patent.

In Column 4, Line 45, delete "that that" and insert -- that --, therefor.

In Column 5, Line 63, delete "node" and insert -- node. --, therefor.

In Column 8, Line 18, delete "like)" and insert -- like). --, therefor.

In Column 17, Line 22, in Claim 4, delete "that that" and insert -- that --, therefor.

In Column 21, Line 24, in Claim 25, delete "that that" and insert -- that --, therefor.

Signed and Sealed this
Fifteenth Day of January, 2013

David J. Kappos
*Director of the United States Patent and Trademark Office*